May 8, 1956     F. F. FOOTE     2,744,357
LAWN EDGING DEVICE
Filed Nov. 3, 1954     2 Sheets-Sheet 1
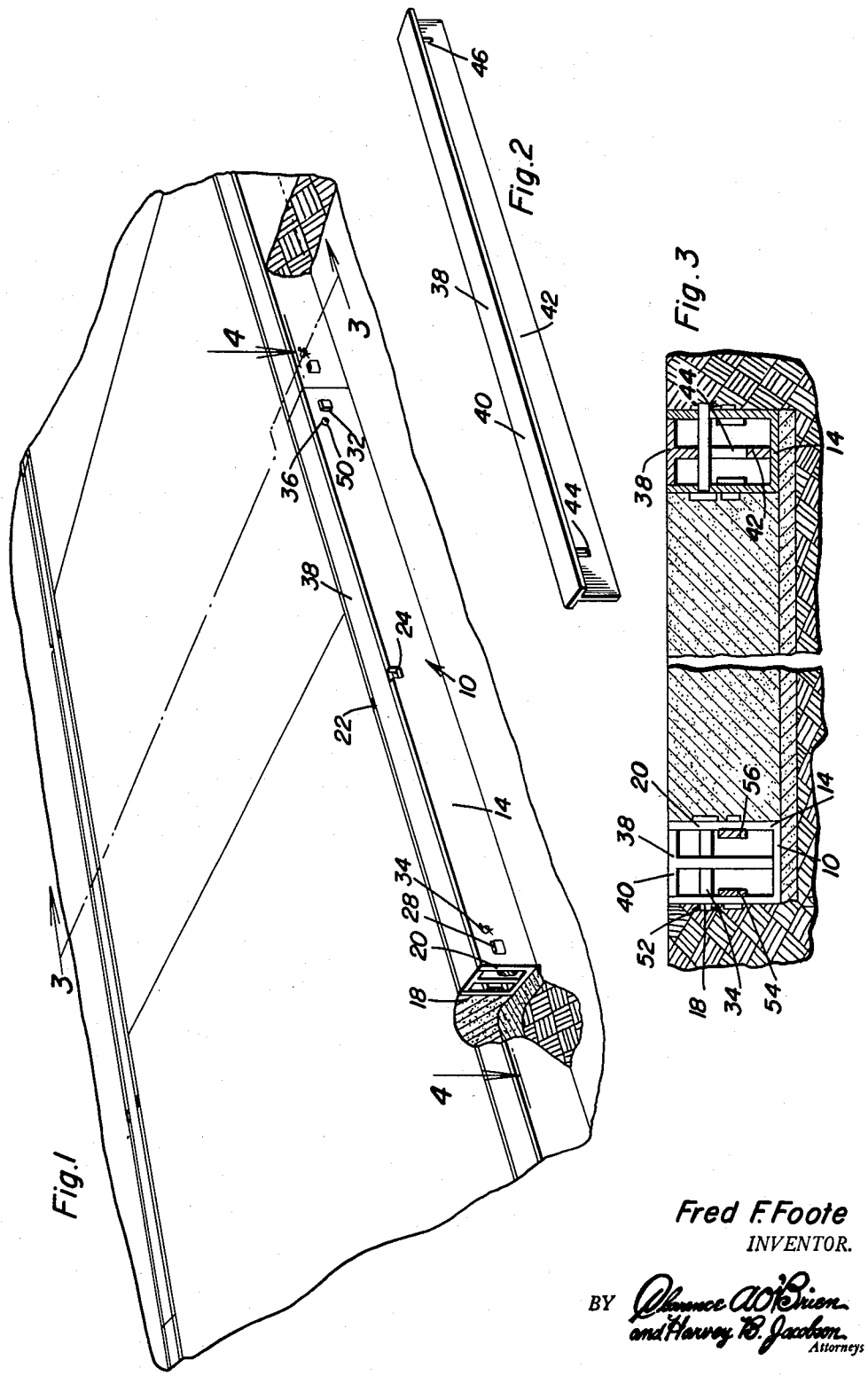
Fred F. Foote
INVENTOR.

May 8, 1956 F. F. FOOTE 2,744,357
LAWN EDGING DEVICE
Filed Nov. 3, 1954 2 Sheets-Sheet 2
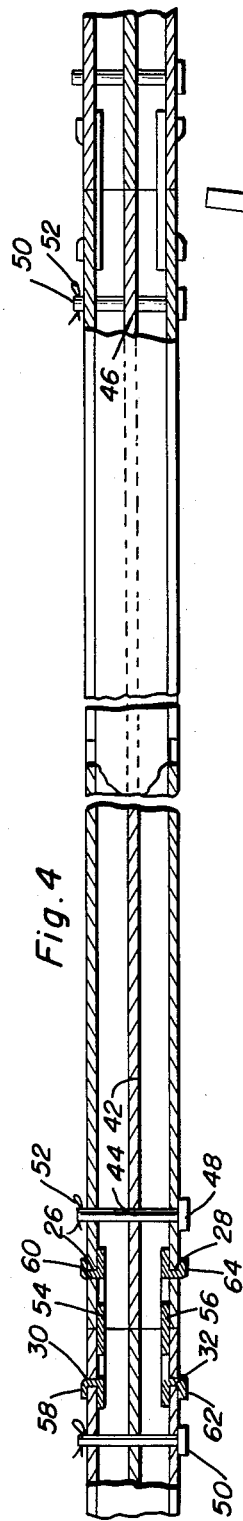
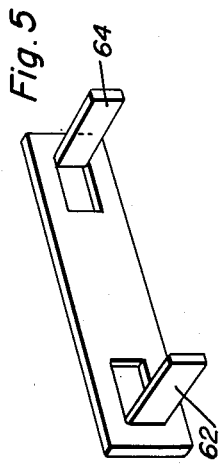
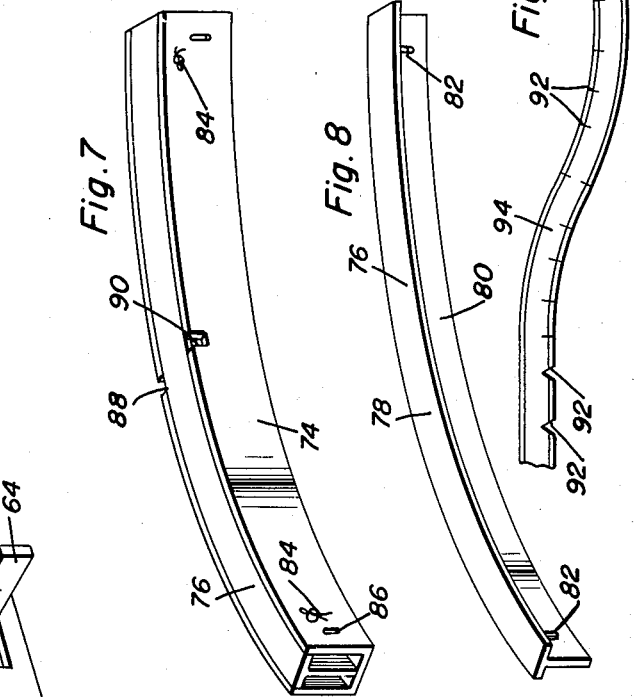
Fred F. Foote
INVENTOR.

United States Patent Office 2,744,357
Patented May 8, 1956

2,744,357
LAWN EDGING DEVICE
Fred F. Foote, Falls Church, Va.

Application November 3, 1954, Serial No. 466,595

6 Claims. (Cl. 47—33)

This invention relates to an edging device for use adjacent the borders of lawns along walks, drives and the like and has for its particular object the maintenance of the edges of lawns in a neat and attractive manner.

A further object of the invention resides in the provision of means for cutting or edging lawns in a rapid and accurate manner requiring only the lifting of the cutting blade and allowing gravity to cause the blade to perform its cutting action.

The construction of this invention features an elongated channel-shaped member formed in sections which are easily assembled in abutting relationship and which are adapted to receive a T-shaped blade, the upper edges thereof cooperating with the channel-shaped member to cut grass growing over the edge of the lawn bordered by this edging device.

Still further objects and features of this invention reside in the provision of an edging device that is simple in construction, strong and durable, highly efficient in operation, unobtrusive in appearance, and which can be bent or constructed to conform to the contours of various shapes encountered in walks or drives.

These, together with the various ancillary objects and features of the invention which will become apparent as the following description proceeds, are attained by this edging device, preferred embodiments of which have been illustrated in the accompanying drawings, by way of example only, wherein:

Figure 1 is a perspective view of an embodiment of the invention shown operatively installed with parts thereof being broken away to show the construction of the invention more clearly;

Figure 2 is a perspective view of a section of the T-shaped blade comprising one of the important elements of the invention;

Figure 3 is an enlarged vertical sectional detail view as taken along the plane of line 3—3 in Figure 1;

Figure 4 is an enlarged horizontal sectional view as taken along the plane of line 4—4 in Figure 1;

Figure 5 is an enlarged perspective view of one of the tie plates used to connect and hold the sections of the channel member in abutting relationship;

Figure 6 is a sectional detail view illustrating the manner in which a pair of tongs may be utilized to raise the T-shaped blade;

Figure 7 is a perspective view of a modified form of the invention provided with a curved blade and a curved channel member;

Figure 8 is a perspective view of one of the curved blade sections; and

Figure 9 is a plan view of a further modified form of the invention shown provided with cuts therein so as to enable the channel member to be bent to such curves or shapes as desired.

With continuing reference to the accompanying drawings wherein like reference numerals designate similar parts throughout the various views, reference numeral 10 is used to generally designate the edging device comprising the present invention which may be positioned on either side of a walk, such as indicated at 12, or along the edges of the lawn, as at driveways, sidewalks and the like so as to provide means for cutting grass and maintaining the walks in a neat and attractive appearance.

The edging device 10 includes a channel-shaped member 14 having a lower connecting portion 16 interconnecting upwardly extending side walls 18 and 20. The side walls 18 and 20 are provided with recesses, as at 22 and 24, opening into the upper edges thereof.

Further, pairs of apertures 26 and 28 and 30 and 32 are formed in each of the sections of the channel-shaped member 14 adjacent the ends of the sections and in addition, aligned holes as at 34 and 36 are formed in the sections of the channel-shaped member 14.

A substantially T-shaped blade 38 having an upper cross-member 40 and a downwardly depending flange 42 is positioned so as to be received within the channel member 14.

The flange 42 of the T-shaped blade 38 is provided with slots, as at 44 and 46, which extend vertically therein and through which pins, as at 48 and 50, are adapted to be inserted after having been positioned within the aligned holes 34 and 36. These pins may have a headed end and may be held in place by suitable cotter pins, as at 52, if desired.

Before the T-shaped blade sections 38 are positioned within the channel member 14, the sections comprising the channel member 14 are arranged in abutting relationship and lockingly secured together by means of pairs of tie plates 54 and 56. The tie plates 54 and 56 are of similar construction and the tie plate 54 includes lugs 58 and 60 struck therefrom while the tie plate 56 includes lugs 62 and 64. The lugs 58 and 60 extend through the apertures 30 and 26 of adjacent sections of the channel member, while the lugs 62 and 64 extend through the apertures 32 and 28. Then, the lugs are hammered or otherwise lockingly engaged so as to hold the tie plates in their desired position. The tie plates, of course, are arranged inwardly of the channel member 14.

In order to utilize the invention, it is merely necessary to utilize a pair of tongs 66 having opposed jaws 68 and 70 and preferably spring pressed, as at 72, to grasp the horizontal portion 40 of the blade 38 in such manner as to enable the blade to be raised after being grasped by insertion of the jaws 68 and 70 through the recesses 22 and 24 into engagement with the horizontal portion 40. Then, the tongs can be released, allowing the blade 38 to fall which will trim and cut the grass growing over the edge of the walk or drive.

In Figure 7, there is shown a modified form of the invention in which the channel member 74 is of arcuate configuration and the blade 76 likewise is arcuately shaped. However, the other elements of the invention are generally similar in use in configuration. As can be readily seen, the blade 76 includes a horizontal portion 78 curved to conform to the configurations of the channel member 74, and a downwardly depending flange 80 provided with slots 82 therein for reception of the pins 84 which extend through the aligned holes in the channel member 74. Apertures 86 are likewise formed in the channel member 74 for enabling the sections of the channel member 74 to be secured together. Recesses, as at 88 and 90 are formed in the upper edges of the side walls of the channel member 74.

In Figure 9, there is shown a further modification of the invention in which triangular cuts, as at 92, are formed in the various sections of the channel member 94, thereby enabling the channel member 94 to be bent or configurated to a desired shape or size. It is to be recognized that the upper portion of the T-shaped blade must likewise be cut.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A lawn and border edging device comprising an elongated channel member having aligned holes therethrough, an elongated T-shaped blade received in said channel member and having an upper cross member cooperating with said channel member to form opposed cutting surfaces, vertically extending slots in said T-shaped blade, and pins extending between said aligned holes in said channel member engaged in said slots to restrain the amount of movement of said T-shaped blade relative to said channel member.

2. A lawn and border edging device comprising an elongated channel member having aligned holes therethrough, an elongated T-shaped blade received in said channel member and having an upper cross member cooperating with said channel member to form opposed cutting surfaces, vertically extending slots in said T-shaped blade, and pins extending between said aligned holes in said channel member engaged in said slots to restrain the amount of movement of said T-shaped blade relative to said channel member, said channel member being constructed in sections, and means holding said sections in abutting relationship.

3. A lawn and border edging device comprising an elongated channel member having aligned holes therethrough, an elongated T-shaped blade received in said channel member and having an upper cross member cooperating with said channel member to form opposed cutting surfaces, vertically extending slots in said T-shaped blade, and pins extending between said aligned holes in said channel member engaged in said slots to restrain the amount of movement of said T-shaped blade relative to said channel member, said channel member having opposed recesses in the upper edges thereof for permitting access to said T-shaped blade.

4. A lawn and border edging device comprising an elongated channel member having aligned holes therethrough, an elongated T-shaped blade received in said channel member and having an upper cross member cooperating with said channel member to form opposed cutting surfaces, vertically extending slots in said T-shaped blade, and pins extending between said aligned holes in said channel member engaged in said slots to restrain the amount of movement of said T-shaped blade relative to said channel member, said channel member being constructed in sections, and means holding said sections in abutting relationship, said means including tie plates having lugs extending outwardly therefrom, apertures in said sections adjacent the ends thereof, said tie plates being received in said channel member with said lugs extending through said apertures.

5. A lawn and border edging device comprising an elongated channel member having aligned holes therethrough, an elongated T-shaped blade received in said channel member and having an upper cross member cooperating with said channel member to form opposed cutting surfaces, vertically extending slots in said T-shaped blade, and pins extending between said aligned holes in said channel member engaged in said slots to restrain the amount of movement of said T-shaped blade relative to said channel member, said channel member having opposed recesses in the upper edges thereof for permitting access to said T-shaped blade.

6. A lawn and border edging device comprising an elongated channel member having aligned holes therethrough, an elongated T-shaped blade received in said channel member and having an upper cross member cooperating with said channel member to form opposed cutting surfaces, vertically extending slots in said T-shaped blade, and pins extending between said aligned holes in said channel member engaged in said slots to restrain the amount of movement of said T-shaped blade relative to said channel member, said channel member having opposed recesses in the upper edges thereof for permitting access to said T-shaped blade, said channel member being constructed in sections, and means holding said sections in abutting relationship, said means including tie plates having lugs extending outwardly therefrom, apertures in said sections adjacent the ends thereof, said tie plates being received in said channel member with said lugs extending through said apertures.

No references cited.